(12) United States Patent
Ando et al.

(10) Patent No.: US 7,588,628 B2
(45) Date of Patent: Sep. 15, 2009

(54) MICROPOROUS CERAMIC MATERIALS (75) Inventors: Yasunori Ando, Nagoya (JP); Seiji Yamada, Nagoya (JP); Hisatomi Taguchi, Nagoya (JP); Yosuke Takahashi, Nagoya (JP); Shigeo Nagaya, Nagoya (JP); Kiyoshi Komura, Nagoya (JP)

(73) Assignees: Noritake Co., Limited, Nagoya (JP); Chubu Electric Power Co., Inc., Nagoya (JP)

( * ) Notice: Subject to any disclaimer, the term of this patent is extended or adjusted under 35 U.S.C. 154(b) by 0 days.

(21) Appl. No.: 11/907,220

(22) Filed: Oct. 10, 2007

(65) Prior Publication Data

US 2008/0092502 A1    Apr. 24, 2008

Related U.S. Application Data (62) Division of application No. 10/647,253, filed on Aug. 26, 2003, now abandoned.

(30) Foreign Application Priority Data

Aug. 28, 2002 (JP) .............. 2002-248458
Sep. 30, 2002 (JP) .............. 2002-286830

(51) Int. Cl.
  *B01D 53/22* (2006.01)
  *B01D 39/20* (2006.01)
  *C04B 38/06* (2006.01)

(52) U.S. Cl. .................. 96/11; 96/4; 96/7; 96/10; 95/45; 210/640; 210/650; 55/523; 55/DIG. 5; 264/628; 264/647; 264/653; 264/666; 501/97.2

(58) Field of Classification Search .......... 96/4, 96/7, 10, 11; 210/640, 650; 55/523, DIG. 5; 264/628, 647, 653, 666; 501/97.1, 97.2; 95/45
See application file for complete search history.

(56) References Cited

U.S. PATENT DOCUMENTS 2,618,565 A    11/1952    Nicholson
4,207,306 A *  6/1980    Jarcho .............. 501/1

(Continued)

FOREIGN PATENT DOCUMENTS

GB    2 131 411 A    6/1984

(Continued)

OTHER PUBLICATIONS

Kingery et al., "Introduction to Ceramics" $2^{nd}$ Edition. Wiley and Sons, p. 9, 1976.

(Continued)

*Primary Examiner*—Jason M Greene
(74) *Attorney, Agent, or Firm*—Oliff & Berridge, PLC (57) ABSTRACT

The present invention provides methods for making a microporous ceramic material using a metal silicon powder and including a reaction sintering process of the silicon. A material for forming a microporous ceramic material used in these methods includes a metal silicon powder, a silicon nitride powder and/or a silicon carbide powder, and if desired, a yttrium oxide powder and/or an aluminum oxide powder. These methods can make a microporous ceramic material that can be used preferably as a gas or liquid filter, a catalyst carrier or a support of a gas separation membrane.

7 Claims, 2 Drawing Sheets

50 μm

U.S. PATENT DOCUMENTS

| | | | |
|---|---|---|---|
| 4,243,621 A | | 1/1981 | Mori et al. |
| 4,285,895 A | | 8/1981 | Mangels et al. |
| 4,388,255 A | * | 6/1983 | Simpson .................... 264/29.1 |
| 4,511,461 A | | 4/1985 | Kruyer |
| 4,690,790 A | | 9/1987 | Bates |
| 4,800,182 A | | 1/1989 | Izaki et al. |
| 4,920,085 A | | 4/1990 | Yoshida et al. |
| 5,114,693 A | * | 5/1992 | Hintermayer et al. ....... 423/344 |
| 5,298,470 A | * | 3/1994 | Chia et al. .................... 501/89 |
| 5,394,015 A | | 2/1995 | Tsuzuki et al. |
| 5,695,700 A | | 12/1997 | Takeuchi et al. |
| 5,696,042 A | | 12/1997 | Matsuura et al. |
| 5,746,969 A | | 5/1998 | Schonfelder et al. |
| 5,846,460 A | * | 12/1998 | Matsuura et al. ............ 264/628 |
| 5,989,319 A | * | 11/1999 | Kawae et al. .................. 96/11 |
| 6,001,759 A | | 12/1999 | Miyanaga et al. |
| 6,162,855 A | | 12/2000 | Langley |
| 6,361,693 B1 | * | 3/2002 | Park ...................... 210/321.89 |
| 6,472,016 B1 | * | 10/2002 | Soria et al. ..................... 96/11 |
| 6,808,663 B2 | | 10/2004 | Noguchi et al. |
| 6,846,764 B2 | | 1/2005 | Inoue et al. |
| 6,869,902 B2 | | 3/2005 | Inoue et al. |

FOREIGN PATENT DOCUMENTS

| | | | |
|---|---|---|---|
| JP | 50-21012 | | 3/1975 |
| JP | 56-22678 | | 3/1981 |
| JP | A-58-095658 A | | 6/1983 |
| JP | A-59-146979 | | 8/1984 |
| JP | A-62-202865 | | 9/1987 |
| JP | A-62-223065 A | | 10/1987 |
| JP | A-63-277576 | | 11/1988 |
| JP | A-1-188479 | | 7/1989 |
| JP | A-3-223166 | | 10/1991 |
| JP | A-4-65360 | | 3/1992 |
| JP | A-4-94736 | | 3/1992 |
| JP | A-4-132662 | | 5/1992 |
| JP | 07-081909 | | 3/1995 |
| JP | A-07-215768 | | 8/1995 |
| JP | 2002-154881 | * | 5/2002 |
| JP | A-2002-154881 | | 5/2002 |
| JP | A-2002-167280 | | 6/2002 |

OTHER PUBLICATIONS

Kato et al., (The USPTO's translation of JP 1-188479).

English Translation of Japanese Office Action in JP 2002-248458.

English Translation of Japanese Office Action in JP 2002-286830.

* cited by examiner

MICROPOROUS CERAMIC MATERIALS

This is a Division of application Ser. No. 10/647,253 filed Aug. 26, 2003. The entire disclosure of the prior application is hereby incorporated by reference herein in its entirety.

This application claims priority to Japanese Patent Applications No. 2002-248458, filed Aug. 28, 2002, and No. 2002-286830, filed Sep. 30, 2002, the contents of which are incorporated herein by reference.

BACKGROUND OF THE INVENTION

1. Field of the Invention

The present invention relates to compositions and methods for making microporous materials made of nonoxide ceramics.

2. Description of the Related Art

Various microporous ceramic materials are used as a filter, a catalyst carrier, a substrate of a separation membrane used as a gas separating member or the like.

In recent years, nonoxide ceramics having silicon such as silicon nitride and silicon carbide as the main constituent gain attention as a microporous ceramic material used for these applications. For example, the microporous ceramic materials having silicon nitride as the main constituent have excellent heat resistance and thermal shock resistance, and are suitable for use under a high temperature environment (300° C. or more, for example, 600° C. or more and less than 1000° C.).

Japanese Laid-Open Patent Publication No. 8-133857 describes a microporous ceramic material comprising silicon nitride which is used under a high temperature environment as a gas or liquid filter or a catalyst carrier and a method for making the same.

Conventionally, the microporous nonoxide ceramic materials used for the above-listed applications are made in the following manner (see the above-mentioned Laid-Open Publication): a powder of the nonoxide ceramic (e.g., silicon nitride powder) is used as the raw material, and the powder was molded into a predetermined shape and sintered. However, the nonoxide ceramic powder such as silicon nitride is expensive, compared with common oxide ceramic powders (e.g., silica powder, alumina powder). For this reason, the nonoxide ceramic materials such as silicon nitride obtained by sintering such a nonoxide ceramic powder are more expensive than oxide ceramic materials.

It is an object of the present invention to provide a microporous ceramic material made of nonoxide ceramics having silicon as the main constituent element in a lower cost of the raw material and more inexpensively than conventional microporous ceramic materials, in particular, to provide a microporous ceramic material suitable for use as a filter, a catalyst carrier, a support of a separation membrane (gas separation membrane or the like).

SUMMARY OF THE INVENTION

The present invention provides materials (compositions) and methods for making microporous ceramic materials that are rich in micropores and composed mainly of nonoxide ceramic at a lower cost.

One composition provided by the present invention is a composition for forming a microporous ceramic material based on silicon nitride and/or silicon carbide. This composition includes a metal silicon powder, in addition to at least one nonoxide ceramic powder selected from the group consisting of a silicon nitride powder and a silicon carbide powder as the raw materials constituting the ceramic matrix. Preferably, the mixing ratio of the metal silicon powder and the nonoxide ceramic powder is 5 parts or more and less than 60 parts of the metal silicon powder with respect to 100 parts of the nonoxide ceramic powder in the mass ratio. More preferably, the mixing ratio of the metal silicon powder and the nonoxide ceramic powder is 25 parts or more and less than 45 parts of the metal silicon powder with respect to 100 parts of the nonoxide ceramic powder in the mass ratio.

Some of the compositions disclosed herein can contain at least one oxide powder selected from the group consisting of a yttrium oxide powder and an aluminum oxide powder. In this case, the content ratio of the metal silicon can be higher. For example, the mixing ratio of the metal silicon powder and the nonoxide ceramic powder is 10 parts or more and less than 100 parts (more preferably, 20 parts or more and less than 90 parts) of the metal silicon powder with respect to 100 parts of the nonoxide ceramic powder in the mass ratio. The content of the oxide powder (the yttrium oxide powder and/or the aluminum oxide powder) added to the composition containing the metal silicon powder and the nonoxide ceramic powder in such a mass ratio is preferably an amount corresponding to 2 mass % or more and less than 250 mass % of the content of the metal silicon powder and not more than 20 mass % of the total amount of the metal silicon powder, the nonoxide ceramic powder and the oxide powder.

The material (composition) for forming a microporous ceramic material disclosed herein contains a metal silicon powder, in addition to a silicon nitride powder and/or a silicon carbide powder. In general, the metal silicon powder is less expensive than the nonoxide ceramic powder. Therefore, if a microporous ceramic material is made of the material (composition) disclosed herein, the production cost can be reduced by the extent that the metal silicon powder is used, compared with the case when a microporous ceramic material is made only with the nonoxide ceramic powder as described above.

The present invention provides a method for making a microporous ceramic material based on a nonoxide ceramic, using a material that can contribute to a reduction of the production cost. More specifically, this method includes preparing any one of the compositions disclosed herein, molding the composition (material for forming a microporous ceramic material) into a molded product having a predetermined shape, and subjecting the obtained molded product to reaction sintering in an atmosphere that allows nitriding. This reaction sintering can produce silicon nitride having high heat resistance from the metal silicon powder in the molded product.

In the production method disclosed herein, a material (composition) containing the metal silicon powder that is less expensive than the silicon nitride powder and the silicon carbide powder is used, so that the production cost is reduced, and a microporous ceramic material based on a nonoxide ceramic can be made more inexpensively. Furthermore, the powder material containing the metal silicon powder can be molded more easily than the powder material made only of the silicon nitride powder or the silicon carbide powder. Therefore, by using a conventional extrusion molding technique or the like, a microporous ceramic material (molded product before firing) having a desired shape can be easily obtained. For example, in the molding process, it is preferable that the composition (molded product) is molded under pressure at a molding pressure set in the range from 30 MPa or more and less than 200 MPa.

Japanese Patent Publication Nos. 52-19207 and 61-38149, and Japanese Laid-Open Patent Publication Nos. 7-81909 and 11-79849 describe a method for making silicon nitride by reaction sintering. However, the methods described in these publications are directed to a method for making an ingot or a silicon nitride structure having a dense structure, and is different from the method of the present invention and is not suitable for making a microporous ceramic material. In other words, in the ceramic material obtained by the conventional nitriding as described in these publications, the micropore size is in the sub-micron level or smaller than that (typically, the average micropore size is 0.1 μm or less), and is not suitable for filters or the like. On the other hand, if the material (composition) for forming a ceramic material disclosed herein is used, a microporous ceramic material having a comparatively narrow micropore size distribution and being rich in micropores having a micropore size of about 1 μm, typically an average micropore size or a peak value of the micropore size distribution of 0.6 μm or more and less than 1.6 μm, particularly preferably 0.8 μm or more and less than 1.2 μm, that can be used preferably as (1) a gas or liquid filter, (2) a catalyst carrier or (3) a substrate (support) of a separation membrane used as a gas separating member or the like, can be made.

It is preferable to use a material (composition) for forming a ceramic material in which the average particle sizes of both the metal silicon powder and the nonoxide ceramic powder are in the range from 1 μm or more and less than 50 μm. By using a material containing the metal silicon powder and the nonoxide ceramic powder having such a particle size, a microporous ceramic material that is rich in micropores having a micropore size of about 1 μm and is suitable for the above applications can be made easily.

Preferably, the average particle size of the metal silicon powder and the average particle size of the silicon nitride powder and the silicon carbide powder are 1 μm or more and less than 50 μm. If a material to be molded containing powders having such an average particle size is used, a microporous ceramic material that is rich in micropores having a micropore size of about 1 μm and is suitable for the above applications can be made easily. When the yttrium oxide powder and/or the aluminum oxide powder are contained, it is preferable that the average particle size of these powders is 0.1 μm or more and less than 1 μm. A material containing a dispersion medium that disperses the metal silicon powder and the nonoxide ceramic powder (the oxide ceramic powder can be contained) is easy to use and is preferable.

DETAILED DESCRIPTION OF THE INVENTION

The technical matters, other than the contents specifically referred to in this specification that are necessary in order to practice the present invention can be considered as a matter of design choice to those skilled in the art based on conventional techniques. The present invention can be practiced based on the technical contents disclosed by this specification, the drawings and by technical common knowledge of the art.

A material for forming a ceramic material (i.e., a composition disclosed herein) used in a method disclosed herein contains a silicon nitride powder and/or a silicon carbide powder (typically, only one of either a silicon nitride powder or a silicon carbide powder) as a nonoxide ceramic component, and a metal silicon powder. Nonoxide ceramic powders (silicon nitride powder and/or silicon carbide powder) having an average particle size (based on microscope measurement or a sedimentation method) of 0.1 μm or more and less than 100 μm are suitably used, and preferably 1 μm or more and less than 50 μm, more preferably 1 μm or more and less than 20 μm, and most preferably 2 μm or more and less than 10 μm are used. When the average particle size is larger than 100 μm, the micropore size and the porosity of a ceramic material that has been made are too large, so that it is not suitable for the applications shown in the above items (1) to (3). On the other hand, an average particle size of smaller than 0.1 μm is not preferable because the ceramic material that has been made has a dense structure having a small micropore size and porosity. Impurities may be present in the silicon nitride powder and/or the silicon carbide powder to be used, but it is preferable that the purity thereof is high (e.g., the content ratio of SiC or $Si_3N_4$ is 99 mass % or more).

A silicon nitride powder and/or a silicon carbide powder either of α crystal structure, β crystal structure or in an amorphous state can be used. However, it is particularly preferable to use a β silicon nitride powder and/or silicon carbide powder, which are thermally stable. A ceramic material having a large number of micropores having a suitable size as a gas or liquid filter, a catalyst carrier or a microporous substrate on which a ceramic separation membrane is formed on its surface can be easily made by using a nonoxide ceramic powder constituted only by β-type powder or having a high ratio of β-type (e.g., the β-type is 50 mass % or more of the total amount of the nonoxide ceramic powder to be used.)

On the other hand, there is no particular limitation regarding the metal silicon powder used for preparing the material (composition), as long as it has been conventionally used to make a silicon nitride by reaction sintering. For example, a metal silicon powder having a specific surface area of 0.1 $m^2/g$ or more and less than 5 $m^2/g$ can be used preferably. The average particle size (based on microscope measurement or a sedimentation method) is 1 μm or more and less than 50 μm, more preferably 1 μm or more and less than 20 μm, and most preferably 2 μm or more and less than 10 μm.

Impurities may be present in the metal silicon powder, but it is preferable that the purity of the metal silicon powder to be used is high. For example, a metal silicon having a Si content ratio of 95 mass % or more (i.e., the content ratio of impurities such as Fe, Al, and Ca is 5 mass % or less) is preferable. It is most preferable to use a high purity silicon powder having a Si content ratio of 99 mass % or more. There is no limitation regarding the shape of the silicon powder to be used, and not only a powder of spherical particles or particle of a similar shape, but also a powder that is an aggregate of particles having irregular shape prepared by, for example, a roll milling or stamp milling can be used preferably.

When a yttrium oxide ($Y_2O_3$) powder and/or an aluminum oxide ($Al_2O_3$) powder is added to the material (composition) for forming a ceramic material (typically, both of these oxide compound powders are added), oxide powders having an average particle size (based on microscope measurement or a precipitation method) of about 0.01 μm or more and less than 5 μm are suitable. However, those having an average particle size equal to or smaller than that of the metal silicon powder and the silicon nitride powder and/or the silicon carbide powder that coexist are preferable. In particular, it is preferable to use a yttrium oxide powder and/or an aluminum oxide powder having an average particle size of 0.1 μm or more and less than 1 μm.

When the silicon nitride powder and/or the silicon carbide powder are mixed with the metal silicon powder, it is preferable to avoid oxidation of the metal silicon and impurities, although the present invention is not limited thereto. For example, it is preferable to mix these raw material powders (further pulverize them, if necessary) in a nonoxidative gas atmosphere such as nitrogen gas or argon gas.

When the oxide powder (yttrium oxide powder and/or aluminum oxide powder) is not added, it is preferable to mix 5 parts or more and less than 60 parts (more preferably 10 parts or more and less than 60, even more preferably 10 parts or more and less than 50 parts) of the metal silicon powder with respect to 100 parts of the nonoxide ceramic powder (the total amount of the silicon nitride powder and the silicon carbide powder) in the mass ratio. When making a microporous ceramic material having an average micropore size (based on a mercury penetration method) of about 0.5 μm or more and less than 2 μm (typically, 0.8 μm or more and less than 1.5 μm), it is preferable to mix 25 parts or more and less than 45 parts (more preferably, 35 parts or more and less than 45, and most preferably about 40 parts) of the metal silicon powder with respect to 100 parts of the nonoxide ceramic powder in the mass ratio.

Alternatively, when the oxide powder (yttrium oxide powder and/or aluminum oxide powder) is added, it is preferable to mix 10 parts or more and less than 100 parts of the metal silicon powder with respect to 100 parts of the nonoxide ceramic powder (the total amount of the silicon nitride powder and the silicon carbide powder) in the mass ratio. In order to reduce the production cost, it is preferable to add 50 parts or more and less than 100 parts of the metal silicon powder with respect to 100 parts of the nonoxide ceramic powder. When only a silicon nitride powder is used as the nonoxide ceramic powder, it is preferable to mix the silicon nitride powder and the metal silicon powder such that 10 vol % or more and less than 50 vol % (more preferably 15 vol % or more and less than 50 vol %, even more preferably 20 vol % or more and less than 50 vol %) of the silicon nitride constituting the nonoxide microporous ceramic material obtained by nitriding and firing (i.e., reaction sintering) are derived from the metal silicon (nitride component). For example, 10 parts or more (which can be 9.5 parts or more) and less than 90 parts, more preferably 15 parts or more and less than 90 parts, and even more preferably 20 parts or more and less than 90 parts of the metal silicon powder in the mass ratio are added with respect to 100 parts of the silicon nitride powder.

Regarding the oxide powder, it is preferable to add a yttrium oxide powder and/or an aluminum oxide powder in an amount corresponding to 2 mass % or more and less than 250 mass % of the content of the metal silicon powder and not more than 20 mass % of the total amount of the metal silicon powder, the nonoxide ceramic powder and/or the oxide powder. In order to reduce the production cost, it is preferable to add a yttrium oxide powder and/or an aluminum oxide powder in an amount corresponding to 5 mass % or more and less than 100 mass % of the content of the metal silicon powder.

For the microporous ceramic material that is preferable for the above-described applications (a filter, a catalyst carrier, a substrate (support) of a separation membrane or the like), the average micropore size or the peak value in the micropore size distribution is in the range approximately from 0.5 μm or more and less than 2.0 μm, more preferably 0.6 μm or more and less than 1.6 μm, and most preferably 0.8 μm or more and less than 1.5 μm, further 0.8 μm or more and less than 1.2 μm, although the present invention is not limited thereto. In order to maintain the mechanical strength, it is preferable that the porosity (based on a mercury penetration method) is smaller than 45 vol %, more preferably 30 vol % or more and less than 40 vol %, and most preferably 35 vol % or more and less than 40 vol %.

When making a microporous ceramic material having such an average micropore size or peak value of the micropore size distribution (based on a mercury penetration method) and porosity in such preferable value ranges, it is preferable to mix a metal silicon powder in an amount in the mass ratio of 20 parts or more and less than 95 parts (most preferably 30 parts or more and less than 95 parts) with respect to 100 parts of the nonoxide ceramic powder. In this case, there is no particular limitation regarding the amount of yttrium oxide powder and/or aluminum oxide powder to be added, as long as it is in the above-described range. However, it is preferable that the total of the yttrium oxide powder and the aluminum oxide powder corresponds to an amount of 10 mass % or more and less than 100 mass % of the metal silicon powder and not more than 20 mass % of the metal silicon powder, the nonoxide ceramic powder and the oxide powder. It is preferable to add these two powders such that the molar ratio ($Y_2O_3$/$Al_2O_3$) of the yttrium oxide and the aluminum oxide is in the range from about 0.8 or more and less than 1.2 (more preferably 0.9 or more and less than 1.1).

These raw material powders (metal silicon powder, nonoxide ceramic powder and, if desired, an oxide powder) for preparing a material (composition) for forming a ceramic material can be mixed by commonly used mixing means such as a ball mill, a mixer or the like.

In addition to the raw material powders, various additives can be added to the material (composition) as appropriate. For example, various sintering additives can be added for the purpose of suppressing grain growth or stabilizing the microporous structure.

Furthermore, an appropriate binder can be added, depending on the molding method to be used. For example, a material (composition) that can be preferably used for extrusion molding can be prepared by mixing an appropriate binder and a dispersion medium (e.g., water, various organic solvents including a low alcohol such as ethanol, and a mixed solution of water and an organic solvent) with a mixture of the raw material powders and kneading the obtained mixture. As such a binder, polyvinyl alcohol, methyl celluloses, polyethylene glycols, propylene glycol, glycerin or the like can be used. As the mixing ratio of the binder, about 5 parts or more and less than 30 parts with respect to 100 parts of the mixture of the raw material powders in the mass ratio is appropriate, but the present invention is not limited thereto. As the kneading means, a kneader or various mixers (ribbon mixer, Henschel mixer or the like) can be used.

There is no particular limitation regarding a method for molding the obtained material to a desired shape, and conventionally commonly used various ceramic molding methods can be used. For example, extrusion molding, pressing, or casting can be used. Pressing (uniaxial pressing, hydrostatic pressing or the like) utilizing a floating die or a pressing machine is preferable. Either hot pressing or cold pressing can be used.

There is no limitation regarding the molding pressure, which depends on the filling ratio of the material, but preferably a molding pressure of about 30 MPa or more and less than 200 MPa (e.g., 100 MPa or more and less than 150 MPa) can be used for pressing. By this pressing, a microporous ceramic material suitable for the above-listed applications that has a relatively narrow micropore size distribution can be made. When making a microporous ceramic material having an average micropore size (based on a mercury penetration method) of about 0.5 μm or more and less than 2 μm (typically, 0.8 μm or more and less than 1.5 μm, for example, 1 μm or more and less than 1.2 μm), a pressure of about 50 MPa or more and less than 200 MPa is preferable. Particularly preferably, pressure molding is performed at a pressure of about 100 MPa or more and less than 200 MPa. A high pressure such as 250 MPa or more is not preferable because it leads to a significant reduction of the porosity (25% or less).

In the method disclosed herein, a molded product is fired in an atmosphere that allows nitriding (atmosphere based on nitrogen gas with a nitrogen partial pressure of 50 kPa or more, ammonia gas and the like, and substantially not including oxygen) at a typical gas pressure of 80 kPa or more and less than 120 kPa (about 0.8 atm or more and less than 1.2 atm) in a temperature range that allows nitriding (preferably 1200° C. or more and less than 1500° C.) for 2 hours or more and less than 12 hours. When the firing temperature is higher than that, or the firing time is longer than that, needle-like (fiber-like) β-silicon nitride is produced and precipitated in a large amount in the sintered product, so that the micropore size is smaller than a desired size or the micropore size distribution tends to be broad, which is not preferable.

For example, heating is performed in a nitrogen atmosphere at a temperature from room temperature to a middle temperature range (700° C. or more and less than 900° C.) at a temperature increase rate of 2° C./min or more and less than 10° C./min (preferably 5° C./min or more and less than 7° C./min). Thereafter, heating is performed in an atmosphere that allows nitriding (typically at a temperature of 1200° C. or more) at a temperature increase rate of 1° C./min or more and less than 5° C./min. Thereafter, it is preferable to store the sintered product in a temperature range that allows nitriding for about 2 hours or more and less than 10 hours. During this storage, it is not necessary to keep the temperature constant and the temperature can be varied as appropriate. For example, the sintered product may be stored at 1300° C. for two hours and then the temperature may be increased to 1500° C. over one hour, and then the sintered product may be stored at that temperature for another one hour. By performing reaction sintering under the above conditions, a silicon nitride can be produced from the metal silicon particles efficiently.

In the method disclosed herein, a crystalline silicon nitride is primarily produced by the reaction sintering, and a nonoxide microporous ceramic material suitable for the above applications can be made that has a peak value of the micropore size distribution or an average micropore size in the range approximately from 0.5 μm or more and less than 2 μm (preferably 0.6 μm or more and less than 1.6 μm, and more preferably 0.8 μm or more and less than 1.5 μm, and most preferably 0.8 μm or more and less than 1.2 μm), and typically a porosity of 45 vol % or less (more preferably 30 vol % or more and less than 40 vol %, and most preferably 35 vol % or more and less than 40 vol %).

According to the present invention, a microporous ceramic material used as a filter, a catalyst carrier, a substrate of a ceramic membrane for gas or liquid separation or the like can be provided at a comparatively low cost by utilizing a metal silicon powder, which is less expensive than a silicon carbide powder or a silicon nitride powder. The present invention also provides a method for making a microporous ceramic substrate for a ceramic membrane for gas separation. Furthermore, a ceramic membrane module for gas separation (gas separating module) using this ceramic material as a support can be provided.

The present invention will now be described more specifically by way of several examples, but the present invention is not limited thereto.

EXAMPLE 1

Production of Microporous Ceramic Materials

Materials for forming a ceramic material having mixing ratios shown in Tables 1 and 2 (i.e., Samples Nos. 1 to 6 and Comparative samples Nos. 1 to 6 for which a SiC powder was used as the nonoxide ceramic powder, and Samples Nos. 7 and 8 and Comparative samples No. 7 for which a $Si_3N_4$ powder was used as the nonoxide ceramic powder) were prepared, using a high purity metal silicon powder (Si purity: 96 mass % or more, an average particle size: about 12 μm), a silicon carbide powder having an average particle size of about 40 μm (SiC purity: 95 mass % or more, free carbon content: 1 mass % or less, hereinafter referred to as "40 μ-SiC powder"), a silicon carbide powder having an average particle size of about 5 μm (SiC purity: 95 mass % or more, free carbon content: 1 mass % or less, hereinafter referred to as "5 μ-SiC powder") or a silicon nitride powder having an average particle size of about 4 μm ($Si_3N_4$ purity: 95 mass % or more, hereinafter referred to as "4 μ-$Si_3N_4$ powder").

TABLE 1

| | mixing ratio (g) | | |
|---|---|---|---|
| Sample No. | 40μ-SiC (particle size about 40 μm) | 5μ-SiC (particle size about 5 μm) | metal silicon (particle size about 12 μm) |
| Sample No. 1 | 50 | — | 5 |
| Sample No. 2 | 50 | — | 10 |
| Sample No. 3 | 50 | — | 20 |
| Sample No. 4 | — | 50 | 5 |
| Sample No. 5 | — | 50 | 10 |
| Sample No. 6 | — | 50 | 20 |
| Com. Sample No. 1 | 50 | — | 45 |
| Com. Sample No. 2 | 50 | — | 110 |
| Com. Sample No. 3 | — | 50 | 30 |
| Com. Sample No. 4 | — | 50 | 45 |
| Com. Sample No. 5 | — | 50 | 110 |
| Com. Sample No. 6 | — | — | 100 |

The particle size is an average particle size. The molding pressure is about 100 MPa.

TABLE 2

| | mixing ratio (g) | |
|---|---|---|
| Sample No. | 4μ-$Si_3N_4$ (particle size about 4 μm) | metal silicon (particle size about 12 μm) |
| Sample No. 7 | 50 | 4.8 |
| Sample No. 8 | 50 | 9.4 |
| Com. Sample No. 7 | 50 | 41.2 |

The particle size is an average particle size. The molding pressure is about 100 MPa.

More specifically, the 40 μ-SiC powder, the 5 μ-SiC powder or the 4 μ-$Si_3N_4$ powder were mixed with the metal silicon powder in the amounts shown in Tables 1 and 2, and water was added in an appropriate amount, and a mixture was blended in a ball mill for 30 minutes. Comparative sample No. 6 in Table 1 was prepared by placing 100 g of a metal silicon powder and an appropriate amount of water in a ball mill without adding either a SiC powder or a $Si_3N_4$ powder, and performing the same procedure.

After drying, the obtained mixed material was filled in a press die having a diameter of 29 mm (sample weight: about 3 g).

Then, uniaxial pressing was performed at a pressure of about 100 MPa (1000 kg/cm$^2$). Each of the obtained molded products was placed in an electric furnace that was filled with a nitrogen atmosphere, and was fired in the following temperature schedule. That is, the temperature was increased from room temperature to 800° C. over two hours (temperature increase rate: 5 to 7° C./min), then the temperature was increased to 1200° C. over two hours (temperature increase rate: 2 to 4° C./min). Thereafter, the temperature was increased to 1375° C. over one hour (temperature increase rate: 2 to 4° C./min) and was maintained at 1375° C. for two hours. Thereafter, the temperature was increased to 1500° C. over one hour (temperature increase rate: 1 to 3° C./min) and was maintained at 1500° C. for one hour. Thereafter, the temperature was decreased gradually to room temperature. With this series of processes, disk-like microporous ceramic materials having a diameter of 29 mm and a height of 2 mm corresponding to the die were obtained from each material (Samples Nos. 1 to 8, Comparative samples Nos. 1 to 7). In the following description, these microporous ceramic materials are denoted by the same sample number as that of the material used.

The micropore diameter and the porosity of each ceramic material obtained by the above procedure were investigated. More specifically, using a commercially available mercury porosimeter (Autopore III (product name) manufactured by Micromeritics Instrument Corporation), the micropore size distribution and the peak value thereof and the porosity were obtained based on a mercury penetration method. Furthermore, for Samples Nos. 1 to 6 and Comparative samples Nos. 1 to 6, the volume ratio of the silicon carbide (SiC) and the silicon nitride (Si$_3$N$_4$) was calculated from the mixing ratio of the raw material powders (the amount of the raw material powders used). For Samples Nos. 7 and 8 and Comparative sample No. 7, the volume ratio of the silicon nitride (raw material component, that is, derived from the Si$_3$N$_4$ powder) and the silicon nitride produced by nitriding of Si (nitride component, that is, derived from the metal silicon) was calculated from the mixing ratio of the raw materials (the amount of the raw materials used). Tables 3 and 4 show the results.

TABLE 3

| ceramic material sample No. | volume ratio (vol %) silicon carbide | volume ratio (vol %) silicon nitride | micropore size peak (μm) | porosity (vol %) |
| --- | --- | --- | --- | --- |
| Sample No. 1 | 90 | 10 | 5.86 | 44 |
| Sample No. 2 | 82 | 18 | 3.08 | 36 |
| Sample No. 3 | 70 | 30 | 1.07 | 37 |
| Sample No. 4 | 90 | 10 | 1.76 | 52 |
| Sample No. 5 | 82 | 18 | 1.29 | 48 |
| Sample No. 6 | 70 | 30 | 1.17 | 45 |
| Com. Sample No. 1 | 51 | 49 | 0.17 | 32 |
| Com. Sample No. 2 | 30 | 70 | 0.12 | 31 |
| Com. Sample No. 3 | 61 | 39 | 0.24 | 40 |
| Com. Sample No. 4 | 51 | 49 | 0.13 | 37 |
| Com. Sample No. 5 | 30 | 70 | 0.16 | 34 |
| Com. Sample No. 6 | 0 | 100 | 0.14 | 38 |

TABLE 4

| ceramic material sample No. | volume ratio (vol %) silicon nitride (derived from raw material) | volume ratio (vol %) silicon nitride (produced by nitriding) | micropore size peak (μm) | porosity (vol %) |
| --- | --- | --- | --- | --- |
| Sample No. 7 | 90 | 10 | 0.7 | 38 |
| Sample No. 8 | 82 | 18 | 0.5 | 37 |
| Com. Sample No. 7 | 51 | 49 | 0.15 | 36 |

As shown in Table 3, for all the microporous ceramic materials of Samples Nos. 1 to 6, the peak value of the micropore size distribution was not less than 1 μm, and the micropore size distribution was narrow with the peak value as the center. The porosity was about 35 vol % or more and less than 50 vol %. Therefore, these ceramic materials can be used preferably as a gas or liquid filter or a catalyst carrier through which gas or air can permeate. In particular, the ceramic materials of Samples Nos. 3 and 6 have a peak value of the micropore size distribution in the range from 0.8 μm or more and less than 1.2 μm, and can be used particularly preferably as a substrate of a ceramic membrane used for gas separation. On the other hand, the formed micropore size of the ceramic materials of Comparative samples Nos. 1 to 6 was too small, so that it is believed that they are not suitable for the above applications.

Furthermore, as shown in Table 4, for the microporous ceramic materials of Samples Nos. 7 and 8, the peak value of the micropore size distribution was not less than 0.5 μm, and the micropore size distribution was narrow with the peak value as the center. The porosity was about 35 vol % or more and less than 40 vol %. Therefore, these ceramic materials as well as the ceramic materials of Samples Nos. 1 to 6 can be used preferably as a gas or liquid filter or a catalyst carrier through which gas or air can permeate. In particular, the ceramic material of Sample No. 7 has a peak value of the micropore size distribution of 0.7 μm and can be used particularly preferably as a substrate of a ceramic membrane for gas separation under high temperature conditions. On the other hand, the formed micropore size of the ceramic material of Comparative sample No. 7 was too small, so that it is believed that it is not suitable for the above applications.

Figure 1:
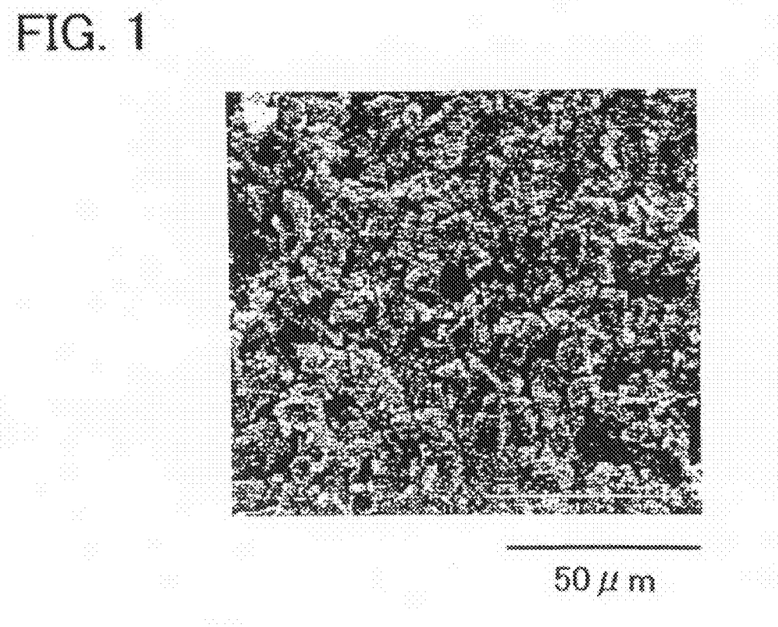
FIG. 1 is an electron microscope (SEM) photograph showing the surface structure of a microporous ceramic material of one example.
Figure 3:
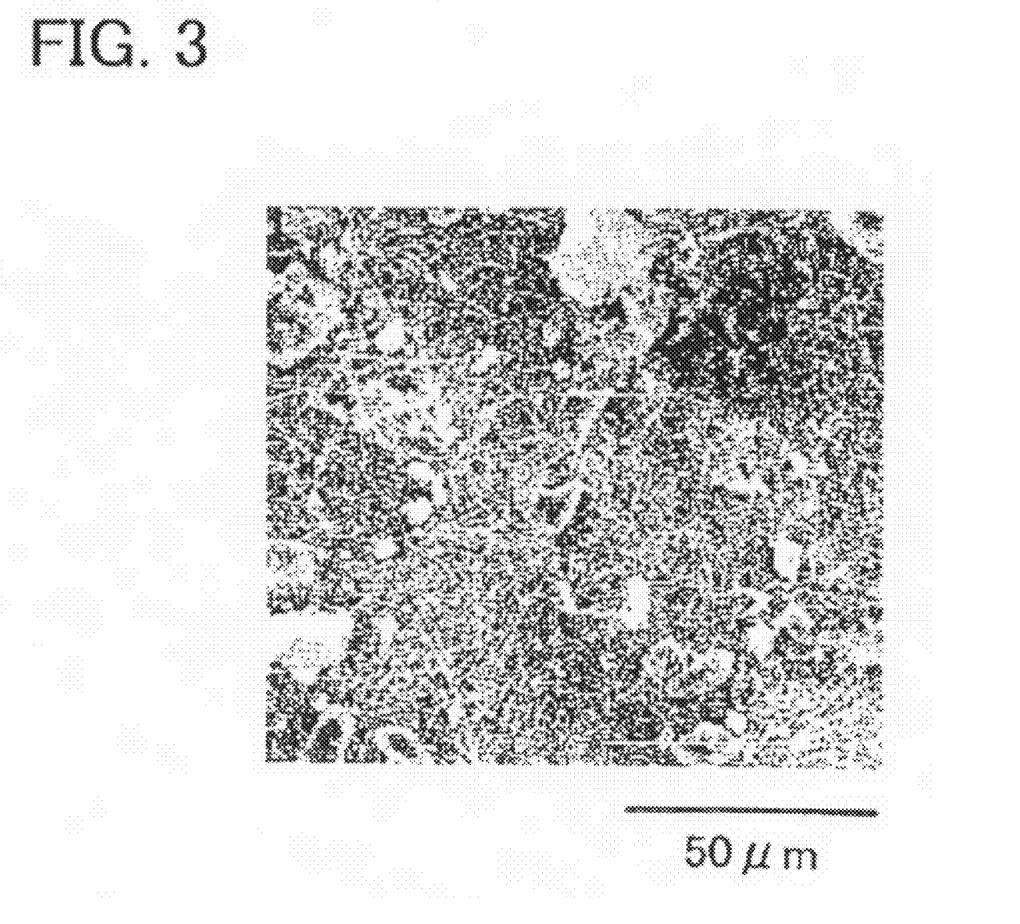
FIG. 3 is an electron microscope (SEM) photograph showing the surface structure of a conventional microporous ceramic material.

The surface of the ceramic material of Sample No. 6 (FIG. 1) and the surface of the ceramic material of Comparative sample No. 1 (FIG. 3) were observed with an electron microscope (SEM). The results confirmed that a large amount of needle-like β-silicon nitride was present on the surface of the ceramic material of Comparative sample No. 1, and the ceramic material of Comparative sample No. 1 had a comparatively dense structure. On the other hand, it was confirmed that substantially no needle-like β silicon nitride was present on the surface of the ceramic material of Sample No. 6, and the ceramic material of Sample No. 6 had a micropore-rich structure.

EXAMPLE 2

Production of Microporous Ceramic Materials

Next, microporous ceramic materials were made using powder materials (compositions) containing a silicon carbide powder as the nonoxide ceramic powder, and a yttrium oxide powder and an aluminum oxide powder as the oxide powder. More specifically, materials for forming a ceramic material having mixing ratios shown in Table 5 (i.e., Samples Nos. 9 to 12) were prepared, using the same high purity metal silicon powder as that used in Example 1 (Si purity: 96 mass % or more, an average particle size: about 12 μm), the 5 μ-SiC powder (SiC purity: 95 mass % or more, free carbon content: 1 mass % or less), a yttrium oxide powder having an average particle size of about 1 μm and an aluminum oxide powder having an average particle size of about 0.3 μm.

TABLE 5

| | mixing ratio (g) | | | |
|---|---|---|---|---|
| Sample No. | silicon carbide (particle size about 5 μm) | metal silicon (particle size about 12 μm) | aluminum oxide (particle size about 0.3 μm) | yttrium oxide (particle size about 1 μm) |
| Sample No. 9 | 50 | 5 | 0.3 | 0.3 |
| Sample No. 10 | 50 | 10 | 0.6 | 0.6 |
| Sample No. 11 | 50 | 20 | 1.2 | 1.2 |
| Sample No. 12 | 50 | 45 | 2.7 | 2.7 |
| Com. Sample No. 3 | 50 | 30 | — | — |
| Com. Sample No. 4 | 50 | 45 | — | — |
| Com. Sample No. 5 | 50 | 110 | — | — |
| Com. Sample No. 6 | — | 100 | — | — |

Molding pressure: about 100 MPa

More specifically, the 5 μ-SiC powder and the metal silicon powder were mixed in the amounts shown in Table 5, and further the yttrium oxide powder and the aluminum oxide powder were added such that the mass ratio of each powder was 6 mass % with respect to the amount of the silicon powder, and water was added in an appropriate amount. Then, a mixture was blended in a ball mill for 30 minutes. Thus, the materials of Samples Nos. 9 to 12 were prepared. Comparative samples Nos. 3 to 6 in Table 5 are the same materials as shown in Table 1.

After drying, in the same manner as in Example 1, each material was filled in a press die having a diameter of 29 mm (sample weight: about 3 g). Then, uniaxial pressing was performed at a pressure of about 100 MPa. Each of the obtained molded products was placed in an electric furnace that was filled with a nitrogen atmosphere, and was fired in the same temperature schedule as described in Example 1. With this series of processes, disk-like microporous ceramic materials having a diameter of 29 mm and a height of 2 mm corresponding to the die were obtained from each material (Samples Nos. 9, to 12). In the following description, these microporous ceramic materials are denoted by the same sample number as that of the material used.

The micropore diameter and the porosity of each ceramic material obtained by the above procedure were investigated in the same manner as described in Example 1. Furthermore, the volume ratio of the silicon carbide (SiC) and the silicon nitride ($Si_3N_4$) of each ceramic material was calculated from the mixing ratio of the raw material powders (the amount of the raw material powders used). Table 6 shows the results.

TABLE 6

| | volume ratio (vol %) | | average | |
|---|---|---|---|---|
| ceramic material sample No. | silicon carbide | silicon nitride | micropore size (μm) | porosity (vol %) |
| Sample No. 9 | 90 | 10 | 1.62 | 44 |
| Sample No. 10 | 82 | 18 | 1.36 | 42 |
| Sample No. 11 | 70 | 30 | 0.90 | 36 |
| Sample No. 12 | 51 | 49 | 1.15 | 36 |
| Com. Sample No. 3 | 61 | 39 | 0.24 | 40 |
| Com. Sample No. 4 | 51 | 49 | 0.13 | 37 |

TABLE 6-continued

| | volume ratio (vol %) | | average | |
|---|---|---|---|---|
| ceramic material sample No. | silicon carbide | silicon nitride | micropore size (μm) | porosity (vol %) |
| Com. Sample No. 5 | 30 | 70 | 0.16 | 34 |
| Com. Sample No. 6 | — | 100 | 0.14 | 38 |

As shown in Table 6, for the microporous ceramic materials of Samples Nos. 9 to 12, the average micropore size was about 0.9 μm to 1.6 μm, and the micropore size distribution was narrow with that average micropore size substantially as the center. The porosity was about 35 vol % to 45 vol %. Therefore, these ceramic materials can be used preferably as a gas or liquid filter or a catalyst carrier through which gas or air can permeate. In particular, the ceramic materials of Samples Nos. 11 and 12 have an average micropore size in the range from 0.8 μm to 1.2 μm, and can be used particularly preferably as a substrate of a ceramic membrane for gas separation.

EXAMPLE 3

Production of Microporous Ceramic Materials

Next, microporous ceramic materials were made using powder materials (compositions) containing a silicon nitride powder as the nonoxide ceramic powder, and a yttrium oxide powder and an aluminum oxide powder as the oxide powder. More specifically, materials for forming a ceramic material having mixing ratios shown in Table 7 (i.e., Samples Nos. 13 to 18) were prepared, using the same high purity metal silicon powder as that used in Example 1 (Si purity: 96 mass % or more, an average particle size: about 12 μm), the 4 μ-$Si_3N_4$ powder ($Si_3N_4$ purity: 95 mass % or more), a yttrium oxide powder having an average particle size of about 1 μm and an aluminum oxide powder having an average particle size of about 0.3 μm.

TABLE 7

| | mixing ratio (%) | | | |
|---|---|---|---|---|
| Sample No. | 4μ-$Si_3N_4$ (particle size about 4 μm) | metal silicon (particle size about 12 μm) | aluminum oxide (particle size about 0.3 μm) | yttrium oxide (particle size about 1 μm) |
| Sample No. 13 | 50 | 4.8 | 3.2 | 7.1 |
| Sample No. 14 | 50 | 4.8 | 0.3 | 0.3 |
| Sample No. 15 | 50 | 9.4 | 3.5 | 7.8 |
| Sample No. 16 | 50 | 9.4 | 0.6 | 0.6 |
| Sample No. 17 | 50 | 18.4 | 4.1 | 9.0 |
| Sample No. 18 | 50 | 41.2 | 5.7 | 12.5 |

More specifically, the 4 μ-$Si_3N_4$ powder and the metal silicon powder were mixed in the amounts shown in Table 7, and further the yttrium oxide powder and the aluminum oxide powder in the amounts shown in Table 7 with respect to the amount of the silicon powder were added, and water was added in an appropriate amount. Then, a mixture was blended in a ball mill for 30 minutes. Thus, the materials of Samples Nos. 13 to 18 were prepared. Among these, for Samples Nos. 14 and 16, the yttrium oxide powder and the aluminum oxide powder were added such that the molar ratio ($Y_2O_3/Al_2O_3$) of the yttrium oxide and the aluminum oxide was about 1/2, that is, 0.5. For the other samples (Nos. 13, 15, 17 and 18), these powders were added such that the molar ratio ($Y_2O_3/Al_2O_3$) was about 1/1, that is, 1.

After drying, in the same manner as in Examples 1 and 2, each material was filled in a press die having a diameter of 29 mm (sample weight: about 3 g). In this example, a plurality of molded products was prepared from each material. Then, uniaxial pressing was performed at about 50 MPa (500 kg/cm$^2$) for some of the plurality of molded products, at about 100 MPa (1000 kg/cm$^2$) for some of them, and at about 150 MPa (1500 kg/cm$^2$) for the rest of them. Each of the obtained molded products was placed in an electric furnace that was filled with a nitrogen atmosphere, and was fired in the same temperature schedule as described in Example 1. With this series of processes, disk-like microporous ceramic materials having a diameter of 29 mm and a height of 2 mm corresponding to the die were obtained from each material (Samples Nos. 13 to 18). In the following description, these microporous ceramic materials are denoted by the same sample number and the same molding pressure level as those of the materials used. For example, No. 13-50 in Table 8 shows a microporous ceramic material obtained by using the material of Sample No. 13 and performing uniaxial pressing at about 50 MPa.

TABLE 8

| ceramic material sample No. | volume ratio (vol %) | | molding pressure (MPa) | average micropore size (μm) | porosity (vol %) |
|---|---|---|---|---|---|
| | silicon nitride (derived from raw material) | silicon nitride (produced by nitriding) | | | |
| No. 13-50 | 90 | 10 | 50 | 0.80 | 36 |
| No. 13-100 | 90 | 10 | 100 | 0.72 | 34 |
| No. 13-150 | 90 | 10 | 150 | 0.70 | 34 |
| No. 14-50 | 90 | 10 | 50 | 0.77 | 42 |
| No. 14-100 | 90 | 10 | 100 | 0.67 | 40 |
| No. 14-150 | 90 | 10 | 150 | 0.64 | 40 |
| No. 15-50 | 82 | 18 | 50 | 0.80 | 38 |
| No. 15-100 | 82 | 18 | 100 | 0.71 | 34 |
| No. 15-150 | 82 | 18 | 150 | 0.68 | 33 |
| No. 16-50 | 82 | 18 | 50 | 0.81 | 41 |
| No. 16-100 | 82 | 18 | 100 | 0.71 | 38 |
| No. 16-150 | 82 | 18 | 150 | 0.65 | 38 |
| No. 17-50 | 70 | 30 | 50 | 0.83 | 36 |
| No. 17-100 | 70 | 30 | 100 | 0.75 | 33 |
| No. 17-150 | 70 | 30 | 150 | 0.75 | 33 |
| No. 18-50 | 51 | 49 | 50 | 0.81 | 36 |
| No. 18-100 | 51 | 49 | 100 | 0.71 | 34 |
| No. 18-150 | 51 | 49 | 150 | 0.66 | 32 |

The micropore diameter and the porosity and the volume ratio of the silicon nitride portion derived from the raw material component and the silicon nitride portion newly produced by nitriding (reaction sintering) of each of the obtained ceramic materials were investigated in the same manner as described above. Table 8 shows the results. As shown in Table 8, for all the microporous ceramic materials made in this example, the average micropore size was about 0.6 μm or more, and the micropore size distribution was narrow with that average micropore size substantially as the center. The porosity was about 30 vol % to 45 vol %. Therefore, these ceramic materials can be used preferably as a gas or liquid filter or a catalyst carrier through which gas or air can permeate. In particular, the ceramic materials of Samples Nos. 13-50, 15-50, 16-50, 17-50 and 18-50 have an average micropore size of 0.8 μm or more, and can be used particularly preferably as a substrate of a ceramic membrane used for gas separation.

Furthermore, as a result of using the same materials and varying the pressure level (50 MPa, 100 MP and 150 MPa) of the uniaxial pressing, it was confirmed that a molding pressure of about 50 MPa is preferable to make a ceramic material having a comparatively large micropore size (Table 8). Furthermore, from comparison between the case using the material of Sample No. 13 and the case using the material of Sample No. 14 and between the case using the material of Sample No. 15 and the case using the material of Sample No. 16, it is preferable to add the yttrium oxide powder and the aluminum oxide powder such that the molar ratio ($Y_2O_3$/$Al_2O_3$) was about 1 in order to realize the porosity of about 35 vol % to 40 vol %.

Figure 2:
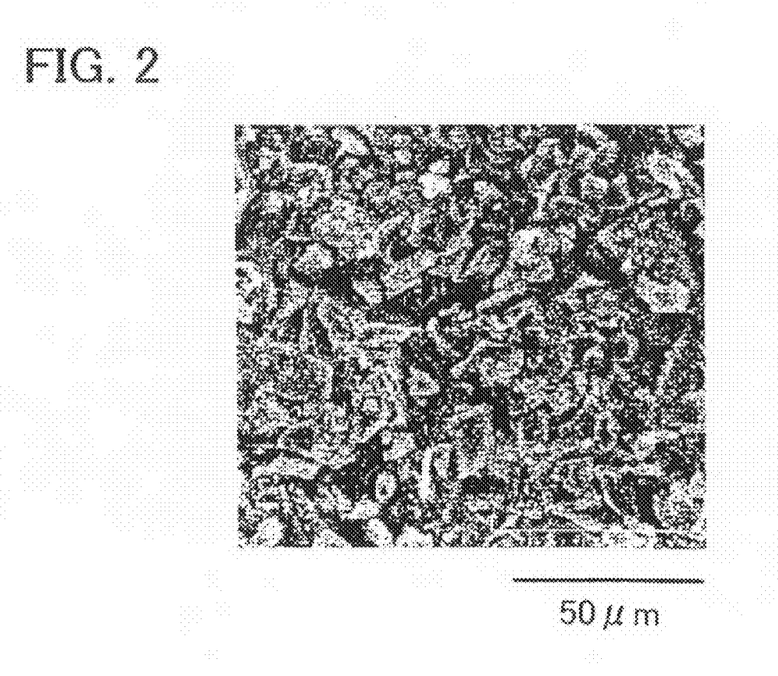
FIG. 2 is an electron microscope (SEM) photograph showing the surface structure of a microporous ceramic material of one example.

The surface of the ceramic material of Sample No. 18-50 was observed with an electron microscope (SEM). As shown in FIG. 2, substantially no needle-like β silicon nitride was present on the surface of the ceramic material of Sample No. 18-50, and the ceramic material of Sample No. 18-50 had a structure that was rich in micropores having a size of 0.8 μm to 1.2 μm, which is suitable as a substrate of a gas separation membrane.

Furthermore, using Samples 13 and 17 as the material for forming a microporous ceramic material, microporous ceramic materials having a shape of a test piece for three-point bending strength (a straight beam shape having a width of 4 mm, a thickness of 3 mm, and a total length of 40 mm) according to JIS were made, and the three-point bending strength was measured according to JIS (R1601).

More specifically, each powder material (Sample No. 13 or 17) was filled in a press die corresponding to the shape of the test piece. In this example, a plurality of molded products was prepared from each material. Then, uniaxial pressing was performed at a pressure of about 20 MPa (200 kg/cm$^2$) for some of the plurality of molded products, at about 50 MPa (500 kg/cm$^2$) for some of them, at about 100 MPa (1000 kg/cm$^2$) for some of them, and at about 150 MPa (1500 kg/cm$^2$) for the rest of them. Each of the obtained molded products was placed in an electric furnace that was filled with a nitrogen atmosphere, and was fired in the same temperature increase schedule as described in Example 1. Thus, a large number of microporous ceramic materials having a shape of a three-point bending strength test piece corresponding to the mold were obtained. In the following description, these microporous ceramic materials are denoted by the same sample number and the same molding pressure level as those of the materials used. For example, No. 13-20 in Table 9 shows a microporous ceramic material (test piece for measuring a three-point bending strength) obtained by using the material of Sample No. 13 and performing uniaxial pressing at about 20 MPa.

Thus, each of the obtained test piece was subjected to a three-point bending strength test according to JIS under the room temperature (25° C.) condition and a high temperature (800° C.) condition. Table 9 shows the results.

TABLE 9

| test piece sample No. | volume ratio (vol %) | | molding pressure (MPa) | three-point bending strength (MPa) (25° C.) | three-point bending strength (MPa) (800° C.) |
|---|---|---|---|---|---|
| | silicon nitride (derived from raw material) | silicon nitride (produced by nitriding) | | | |
| No. 13-20 | 90 | 10 | 20 | 14 | 13 |
| No. 13-50 | 90 | 10 | 50 | 17 | 16 |
| No. 13-100 | 90 | 10 | 100 | 27 | 28 |
| No. 13-150 | 90 | 10 | 150 | 33 | 34 |
| No. 17-20 | 70 | 30 | 20 | 31 | 31 |
| No. 17-50 | 70 | 30 | 50 | 44 | 44 |
| No. 17-100 | 70 | 30 | 100 | 55 | 59 |
| No. 17-150 | 70 | 30 | 150 | 81 | 84 |

As shown in Table 9, in either case of the materials, the material produced at a higher molding pressure has a higher bending strength, regardless of the temperature (Sample No.

13-20<13-50<13-100<13-150, and Sample No. 17-20<17-50<17-100<17-150). In particular, the microporous ceramic material (bending strength test piece) made of Sample No. 17 (see Table 7 with respect to the composition) achieved a bending strength of 40 MPa or more at a molding pressure of 50 MPa, a bending strength of 50 MPa or more at a molding pressure of 100 MPa, and a bending strength of 80 MPa or more at a molding pressure of 150 MPa.

Specific examples of the present invention have been described above, but they are only illustrative and are not limiting to the scope of these claims. All changes and modifications from the specific examples illustrated above are intended to be embraced in the techniques disclosed in the appended claims. The technical elements described in the specification or the drawings, can exhibit technical usefulness, either alone or in combination, and combinations are not limited to those described in the claims as filed. The techniques illustrated in the specification or the drawings can achieve a plurality of purposes at the same time, and achieving only one of them has technical usefulness.

What is claimed is:

1. A microporous ceramic substrate of a gas separation membrane, the substrate
    comprising primarily alpha-silicon nitride;
    containing essentially no needle-like beta-silicon nitride;
    having a maximum of micropore size distribution at or an average micropore size of 0.5 μm or greater, but less than 2 μm; and
    having a porosity of 30% or greater, but less than 40%, and wherein the substrate is produced by a manufacturing process comprising the steps of:
    (A) preparing a starting material containing silicon nitride power and metal silicon powder at a mass ratio of 100 parts of silicon nitride to between 10 and 100 parts of metal silicon; and further containing yttrium oxide powder and aluminum oxide powder at a molar fraction of yttrium oxide to aluminum oxide ($Y_2O_3/Al_2O_3$) in a range from 0.9 to 1.1 and each at 2% by mass or greater, but less than 250% by mass of the amount of metal silicon powder, and yet not exceeding 20% by mass of the total amount of the starting material,
    (B) molding the starting material into a prescribed shape; and
    (C) subjecting the molded product of the prescribed shape to reaction sintering at a temperature from 1200° C. to 1500° C. in an atmosphere that allows nitrization.

2. A microporous ceramic substrate according to claim 1 having a three-point bending strength of 40MPa or greater when measured at 800° C. according to JIS (R1601).

3. A microporous ceramic substrate according to claim 1 containing yttrium oxide and aluminum oxide at a molar fraction $Y_2O_3/Al_2O_3$ in a range from 0.9 to 1.1.

4. A microporous ceramic substrate according to claim 1, wherein the molded product is heated from room temperature to a temperature of 700° C. or higher, but lower than 900° C. at a temperature increase rate of 5° C./minute or greater, but less than 7° C./minute; is further heated to a temperature of 1200° C. or higher at a temperature increase rate of 1° C./minute or greater, but less than 5° C./minute; and is stored at a temperature between 1200° C. to 1500° C. for 2 hours or more, but less than 10 hours.

5. A microporous ceramic substrate according to claim 1, wherein the average particle size of silicon nitride powder and that of metal silicon powder are both in a range from 1 μm to 50 μm; and the average particle size of yttrium oxide powder and that of aluminum oxide powder are in a range from 0.1 μm to 1 μm.

6. A microporous ceramic substrate according to claim 1, wherein the starting material is molded with applied pressure from 100 MPa to 200 MPa.

7. A microporous ceramic substrate according to claim 6 having a three-point bending strength of 50 MPa or greater when measured at 800° C. according to JIS (R1601).

* * * * *